(No Model.) 2 Sheets—Sheet 1.

G. W. WATERS.
CASTER ATTACHMENT FOR PLOWS.

No. 560,952. Patented May 26, 1896.

WITNESSES:
H. Walker
Wm P. Patton

INVENTOR
G. W. Waters
BY
[signature]
ATTORNEYS (No Model.) 2 Sheets—Sheet 2.
G. W. WATERS.
CASTER ATTACHMENT FOR PLOWS.
No. 560,952. Patented May 26, 1896.
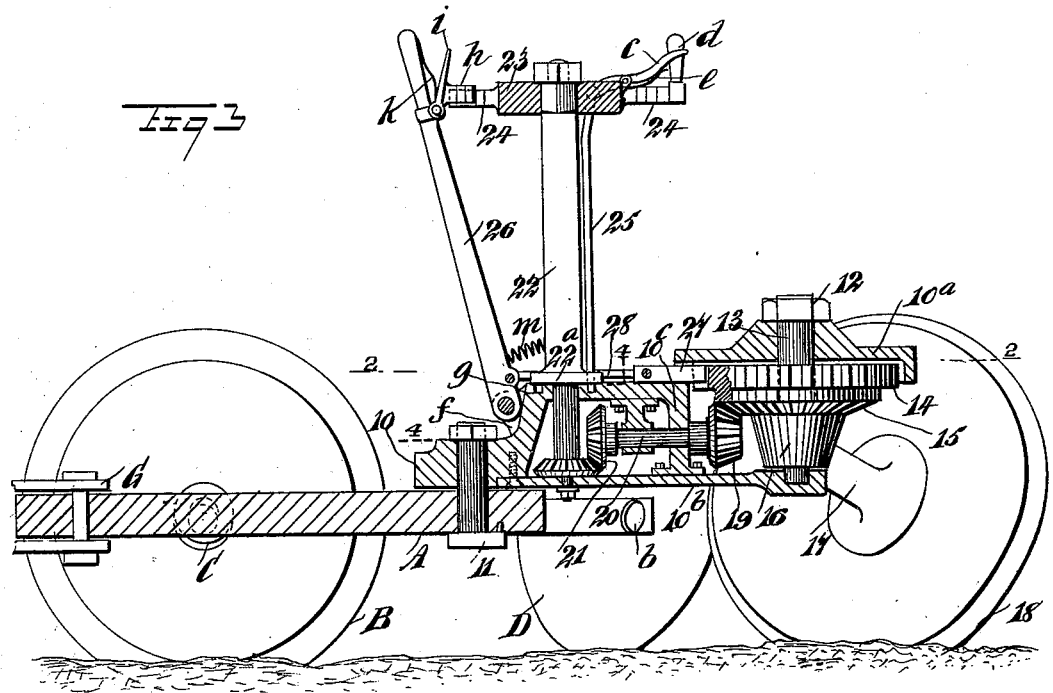
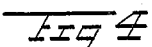
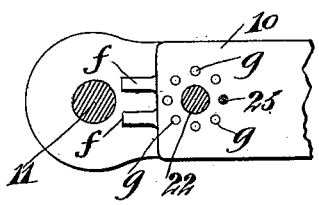
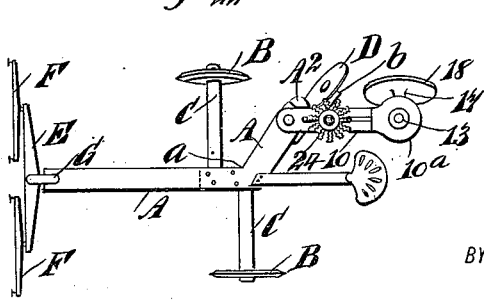
WITNESSES:
H. Walker
Wm. P. Patton
INVENTOR
G. W. Waters
BY
ATTORNEYS
ANDREW B.GRAHAM. PHOTO-LITHO. WASHINGTON, D.C.

UNITED STATES PATENT OFFICE.

GEORGE W. WATERS, OF CORPUS CHRISTI, TEXAS.

CASTER ATTACHMENT FOR PLOWS.

SPECIFICATION forming part of Letters Patent No. 560,952, dated May 26, 1896.

Application filed January 18, 1896. Serial No. 575,951. (No model.)

*To all whom it may concern:*

Be it known that I, GEORGE W. WATERS, of Corpus Christi, in the county of Nueces and State of Texas, have invented a new and Improved Caster Attachment for Plows and Like Implements, of which the following is a full, clear, and exact description.

This invention relates to a novel caster attachment for plows, and more particularly to plows having disk cutters and other wheels that adapt the plow for carrying the driver or plowman along with it while in use.

The objects of my invention are primarily to provide a simple and practical attachment for a sulky or other plow which will enable the operator to readily turn the plow at any point where this may be desired while the plow is in service, and, furthermore, to furnish a device of the above-indicated character which will be especially well adapted to facilitate the turning movement of a disk plow and dispense with the use of a tongue to guide the plow.

A further object is to provide a plow attachment of the caster type which will be convenient in service, be adapted for quick and reliable adjustment to turn the plow while moving, and that will be capable of adjustment to hold the plow from turning until such a movement is necessary.

The invention consists in the novel construction and combination of parts, as is hereinafter described, and defined in the claims.

Reference is to be had to the accompanying drawings, forming a part of this specification, in which similar characters of reference indicate corresponding parts in all the views.

Figure 1:
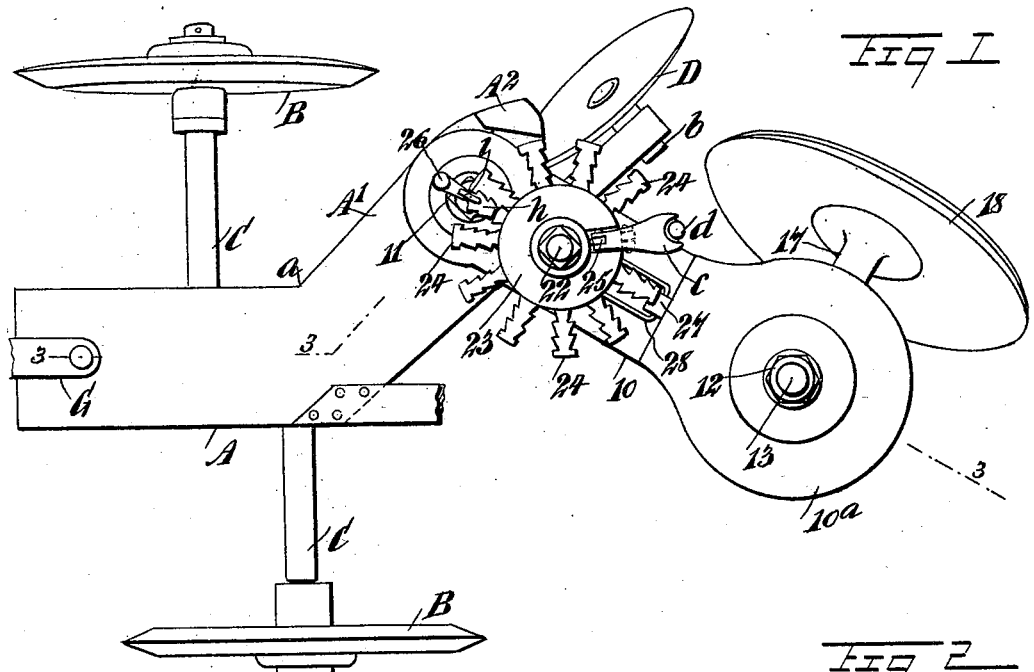
Figure 2:
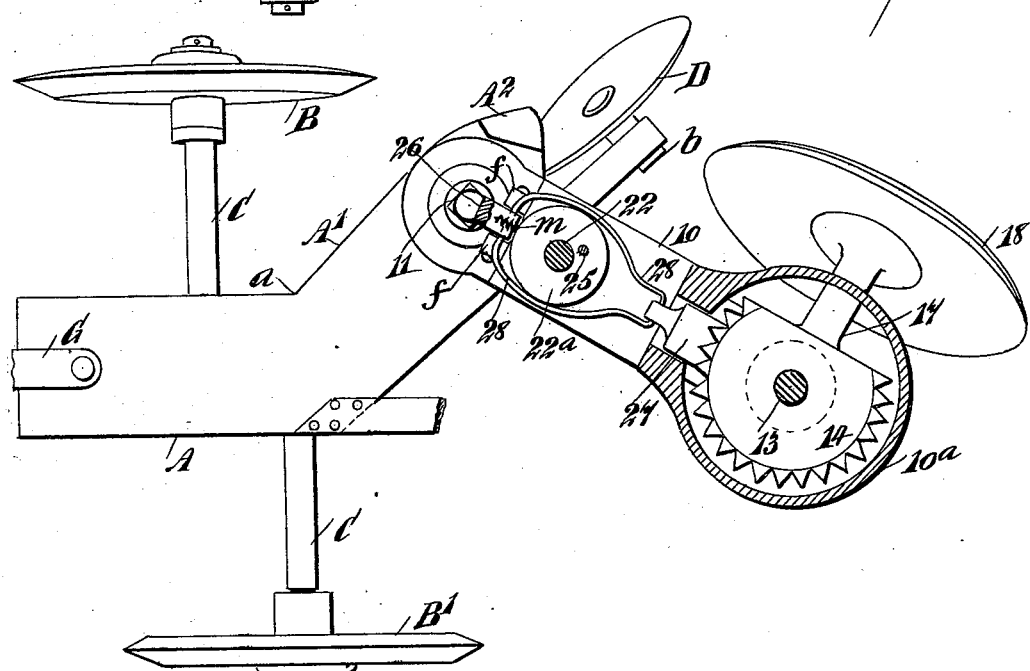

Figure 1 is a plan view of the improved caster in place on a disk plow. Fig. 2 is a partly sectional plan view of the improvements on a disk plow, taken substantially on the line 2 2 in Fig. 3. Fig. 3 is a partly sectional side view of the improvements on a disk plow, essentially on the broken line 3 3 in Fig. 1. Fig. 4 is a partly sectional plan view of details, showing a portion of the caster-frame and attached parts of the caster mechanism; and Fig. 5 is a plan view of the plow and caster attachment thereon, shown on a reduced scale.

The plow shown to illustrate the application of the improvements is one of a number of different styles to which the novel caster attachment is applicable, and comprises a plow-beam A, that is angularly bent at $a$ to afford a lateral and rearwardly-projecting member A' therefor.

On the sides of the beam A two ground-wheels B B' are supported to rotate on fixed axles C, that have sufficient length to properly separate the wheels that are loosely mounted on their outer ends.

On the plow-beam portion A' the cutter-disk D of the plow is supported to revolve, and it is given a proper inclination on a spud-axle $b$, that is sustained by a projection from the rear portion of the plow-beam, so that the disk will be adapted to cut a slice from the unplowed land and turn it away from the same, producing a furrow. It will be noticed that the ground-wheel B will track in a furrow that has been cut by the disk D, while the wheel B' is the landside-wheel and travels on the unplowed soil.

The frame 10, provided to support other parts of the improved caster attachment, consists of a preferably metal block having a suitable length, and at its front end said frame-piece is secured to laterally swing on the rear end of the plow-beam member A' by a strong pintle-bolt 11. (Best shown in Fig. 3.)

For effective service there is an upward projection $A^2$, formed on the plow-beam member A' at its rear end, which will receive the impinge of the frame 10 and prevent the latter from swinging too close to the disk cutter D, as shown in Figs. 1 and 2. The frame 10 has sufficient bearing on the beam portion A' to assure the stability of said connection, and from the rear end of the plow-beam the frame is upwardly and rearwardly projected to permit the proper engagement therewith of other working parts of the caster device.

At the rear end of frame 10 a circular recess is produced on its lower side, forming a gear-case $10^a$. The gear-case is centrally and vertically perforated to receive a strong pivot-stud 13, which centrally projects from the spur-gear 14, that has a bevel-gear 15 concentrically formed or secured on its lower side, and from the lower side of the bevel-gear a stout hub 16 centrally depends, from which laterally projects a spud-axle 17, having a proper downward inclination and revolubly supporting the caster-wheel 18 on the outer end of the same. The pivot-stud 13 and all parts hung therefrom are held loosely connected to the gear-case 10ª by a nut 12, or by any other preferred means, so that the caster-wheel 18 may receive orbital movement around the rear end of the frame 10.

As shown in Fig. 3, the hub 16 is journaled at its lower end in and receives support from a bracket-plate 10ᵇ, that is a portion of frame 10, the said plate being spaced from the upper portion of the frame by an attachment thereto at its front end, and also to an arm 10ᶜ, that projects down from said upper part near the gear-case 10ª. There is a bevel-pinion 19 secured on the rear end of a horizontal counter-shaft 20, and said pinion is held in meshed engagement with the bevel-gear 15 by a suitable support afforded the counter-shaft from the frame 10, that permits the rotation of said shaft. On the front end of shaft 20 another bevel-pinion 21 is secured, which meshes with a similar pinion that is affixed on the lower portion of the vertical standard 22. A proper length is afforded the standard 22, and its lower end is journaled in the bracket-plate 10ᵇ, whereon the pinion 21 is seated. There is a base-flange 22ª circumferentially formed or secured on the standard 22 at a point which will permit it to seat on the upper face of the frame 10, through which said standard is loosely inserted before the pinion 21 is secured thereto.

On the upper end of the standard 22 a hand-wheel is mounted, and preferably said connection of parts is effected by producing a squared or other polygonal formation on the upper end portion of the standard, which terminates in a reduced bolt end whereon a nut is screwed after the hub 23 of the wheel is slid on the squared part, the hole in said hub being shaped to fit on the latter. A suitable number of radial arms 24 are projected at spaced distances apart from the edge of the hub 23, and preferably a number of teeth are oppositely projected on the side edges of adjacent pairs of arms, as shown in Fig. 1. One of the radial arms 24 is provided with an upright handle d at its free end for convenient rotation of the hand-wheel, and on the hub 23 a tripping-lever c is pivoted to rock, having its longer member projected toward the handle d and pressed upwardly by a spring e. The inner end of the tripping-lever c is pivoted to the upper end of the locking-bar 25, which bar extends downward, having sufficient length to permit its lower portion to loosely pass through a hole in the base-flange 22ª and engage the portion that projects through said flange with one of a circular row of sockets or perforations formed in the top of the frame 10, the said spaced perforations g being arranged concentric with the standard 22, as shown in Fig. 4. A detent-lever 26 is pivoted by its lower end, preferably between two ears f, that are spaced projections on the front of the frame 10, where it offsets to project upward and rearward from its pad that seats on the plow-beam member A'. At the upper end of the detent-lever a handle is formed, and close to the handle a locking-dog is pivoted on the lever, said dog comprising a toothed limb h, projected outward from a finger-piece i, that is pressed away from the lever by a spring k, as shown clearly in Fig. 3. The limb h of the locking-dog has its edges serrated, these teeth being adapted to interlock with the similar teeth on opposite edges of any two of the radial arms 24 when the pair of arms to be thus engaged occupy a position that will permit an introduction of the limb of the dog between them. To interlock the dog-limb h with the hand-wheel, the detent-lever 26 is pushed toward the hand-wheel hub 23, compressing a spring m, that is located between the standard 22 and edge of the detent-lever, and when the lever is near enough to the hub the operator raises the limb h by pressure on the finger-piece i, that when released will be actuated by spring k to press the said limb into locking engagement with the hand-wheel arms. A stop-block 27 is positioned on the upper side of frame 10 near the open front side of the gear-case 10ª, and said block has teeth cut on its rear edge that will fit into spaces between the teeth on the spur-wheel 14 and serve to lock said gear from rotation when the stop-block is adjusted to effect the locking of the gear mentioned. A furcated link 28, which has a loose connection with the stop-block 27 and projects foward at each side of the standard 22, is pivotally attached by its front portion to the detent-lever 26 above the point of pivotal connection of the latter with the frame 10, and it will be seen that the rearward vibration and locking engagement of said lever with the radial arms of the hand-wheel will effect a similar contact of the block 27 with the spur-gear 14.

The plow when provided with the improved caster-wheel attachment need not be furnished with a tongue, but may have the doubletree E and singletrees F directly connected to the forward end of the plow-beam A, as shown in Fig. 5, such a connection of the clevis G being also indicated in Figs. 1, 2, and 3. If preferred, the driver may be furnished with a seat that is supported to project rearward from the plow-beam A, as shown in Fig. 5, and the seat is at the side of the plow, which will permit the driver to freely manipulate the lever 26, handle d of the hand-wheel or standard 22, and the tripping-lever c for actuation of the locking-bar 25.

In operation the furrow cut by the disk D will be occupied by the caster-wheel 18 when the plow is drawn to turn the soil, and when it is desired to turn the plow either to the right or left the operator releases the lever 26 and turns the hand-wheel by its handle d, so as to positively move the caster-wheel in the proper direction to enable the team to turn the plow, and as the locking-bar 25 will be depressed to enter a socket or perforation *g* in the frame 10 at a suitable point for the retention of the standard 22 from rotation it will be apparent that the caster-wheel may be held at any desired point in its orbital movement around the pivot-stud 13, that affords support thereto.

It is claimed for this improved caster attachment that the plow may be turned completely around in a very small space either to the right or left, as occasion may require, and that the use of a tongue for guidance of the plow may be dispensed with.

It is evident that the improved caster attachment may be used in connection with disk plows having more than one disk or cutter and that the driver may walk and be able to manipulate the adjusting devices of the attachment with the same facility as if riding on the plow.

Having thus fully described my invention, I claim as new and desire to secure by Letters Patent—

1. The combination with a plow, of a caster-wheel, a device for orbitally moving said wheel that is adapted for manual control in service, and means to hold the caster-wheel at any point of orbital movement, substantially as described.

2. The combination with a disk plow, and a frame pivoted thereon, of a caster-wheel held laterally projected on a pivot-stud at the rear of said frame, and a manually-controlled device to swing and lock the caster-wheel at different points of orbital movement around the pivot-stud while the plow is in service, substantially as described.

3. The combination with a plow-beam, a ground-wheel, a furrow-wheel opposite thereto, a disk cutter rearward of the furrow-wheel, and means to connect draft force directly with the plow-beam, of a frame laterally rockable on the plow-beam, a pivot-stud thereon, a caster-wheel rotatable on a spud-axle that projects laterally from the pivot-stud below its connection with the frame, and manually-movable devices having gearing adapted for rotatably moving and subsequently holding the pivot-stud and caster-wheel from revoluble movement, substantially as described.

4. The combination with a disk plow, a pivoted frame on the rear end of said plow, and a caster-wheel pivoted to swing laterally on the rear of the frame, of a spur-gear on the pivot of the caster-wheel, and a locking device for the spur-gear, comprising a slidable locking-block having teeth adapted to engage the teeth of the said gear, and means for sliding and locking and subsequently releasing the slide-block from engagement with the spur-gear, substantially as described.

5. In a caster-wheel attachment for disk plows, the combination with a laterally-bent plow-beam, of a frame pivoted thereon, a pivot-stud on the rear of said frame, a spur-gear and a bevel-gear on the pivot-stud below the frame, a spud-axle projected from a hub of the pivot-stud below the bevel-gear, a caster-wheel rotatable on the spud-axle, a device for rotatably moving the bevel-gear, means for locking said rotating device, and a device adapted to hold the caster-wheel at any point of its orbital movement around the pivot-stud, substantially as described.

GEORGE W. WATERS.

Witnesses:
R. G. BLOSSMAN,
J. B. THOMPSON.